Oct. 9, 1945.  E. S. ELLIS  2,386,451
WELD FLASH TRIMMING MACHINE
Filed March 31, 1942  3 Sheets-Sheet 1

INVENTOR.
EMMETT S. ELLIS
BY
ATTORNEYS

Oct. 9, 1945.     E. S. ELLIS     2,386,451
WELD FLASH TRIMMING MACHINE
Filed March 31, 1942     3 Sheets-Sheet 2
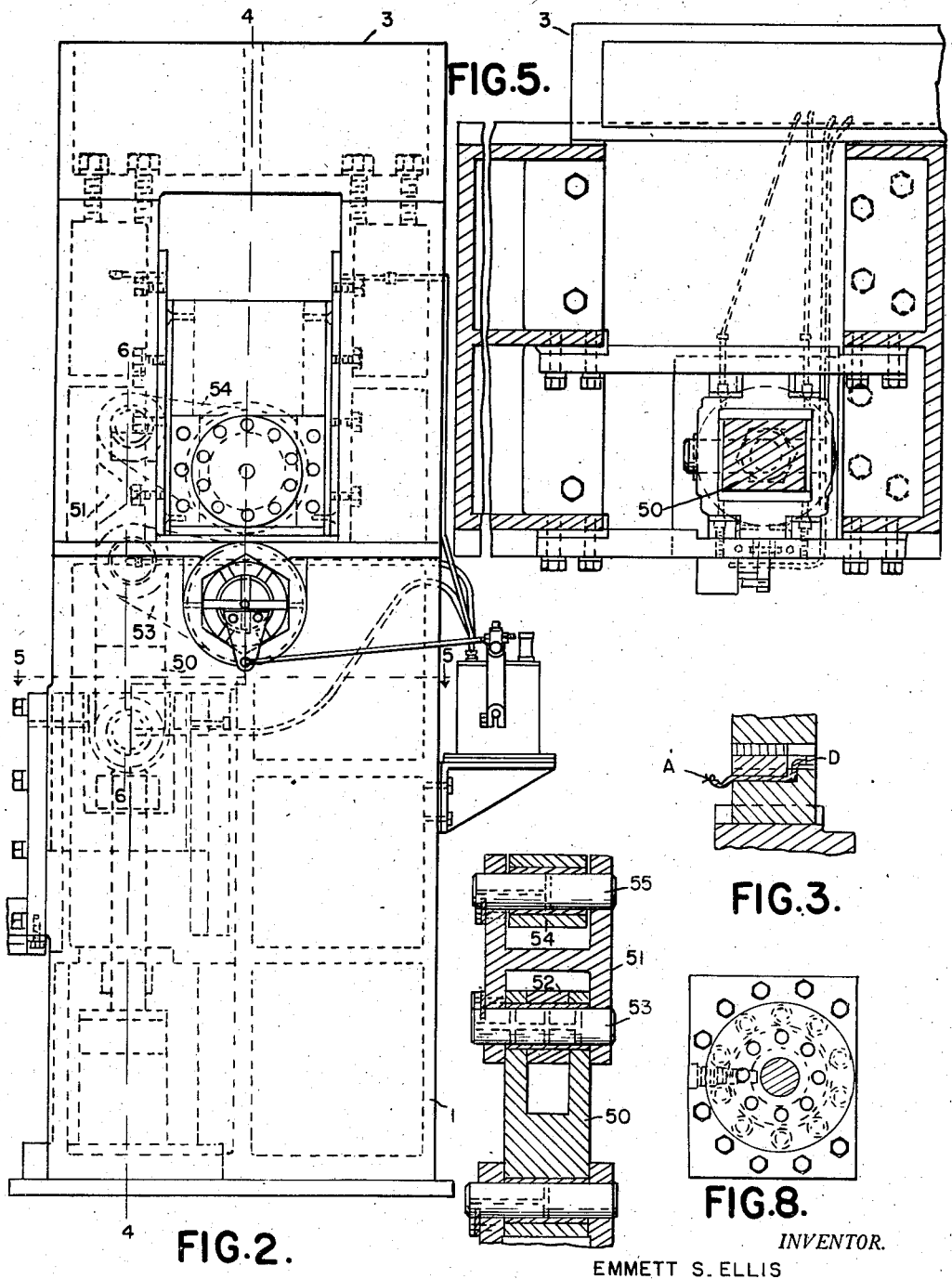
INVENTOR.
EMMETT S. ELLIS
BY 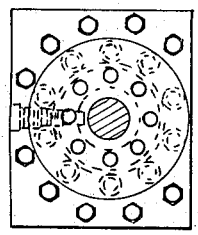
ATTORNEYS Oct. 9, 1945.  E. S. ELLIS  2,386,451
WELD FLASH TRIMMING MACHINE
Filed March 31, 1942  3 Sheets-Sheet 3

INVENTOR.
EMMETT S. ELLIS
BY
ATTORNEYS

Patented Oct. 9, 1945

2,386,451

UNITED STATES PATENT OFFICE 2,386,451

WELD FLASH TRIMMING MACHINE

Emmett S. Ellis, Pontiac, Mich., assignor to Kelsey-Hayes Wheel Company, Detroit, Mich., a corporation of Delaware Application March 31, 1942, Serial No. 437,093

11 Claims. (Cl. 90—24)

The invention relates to weld flash trimming machines and refers more particularly to machines for trimming the flash or extruded metal of a welded rim element.

The invention has for some of its objects to provide an improved weld flash trimming machine constructed to automatically compensate for variations in the thickness of the work so that the proper amount of weld flash will be removed and to provide a machine making use of the work to properly position the cutter mechanism relative to the work.

The invention has for other objects to provide a machine for trimming the weld flash of work of formed cross section or work having angularly disposed portions, the machine having its cutter mechanism formed with a cutting edge corresponding to the contour of a part of a side of the work; to provide a machine having cutter blades for simultaneously removing portions of the weld flash at opposite sides of the weld work and to carry the cutter blades on cutter heads which are relatively movable toward and away from each other and also relatively movable longitudinally of each other; to provide a machine in which the relative longitudinal positions of the cutter blades are determined by direct contact with the work; and to provide a machine for trimming the weld flash of a rim in which the cutter blades are relatively longitudinally positioned by contact with a portion of the rim extending at an angle to the rim base.

The invention has for further objects to provide a weld flash trimming machine having angularly movable cutter blades mounted on oscillatory cutter heads; to provide a machine in which the cutter blades are moved in opposite directions along the work to remove the weld flash; and to provide the machine with an improved mechanism for oscillating the cutter blades.

With these and other objects in view, the invention resides in the novel features of construction and combinations and arrangements of parts as more fully hereinafter set forth.

In the drawings:

Figures 1 and 2 are front and rear elevations of the weld flash trimming machine embodying the invention;

Figure 3 is a cross section on the line 3—3 of Figure 1;

Figures 1, 7:
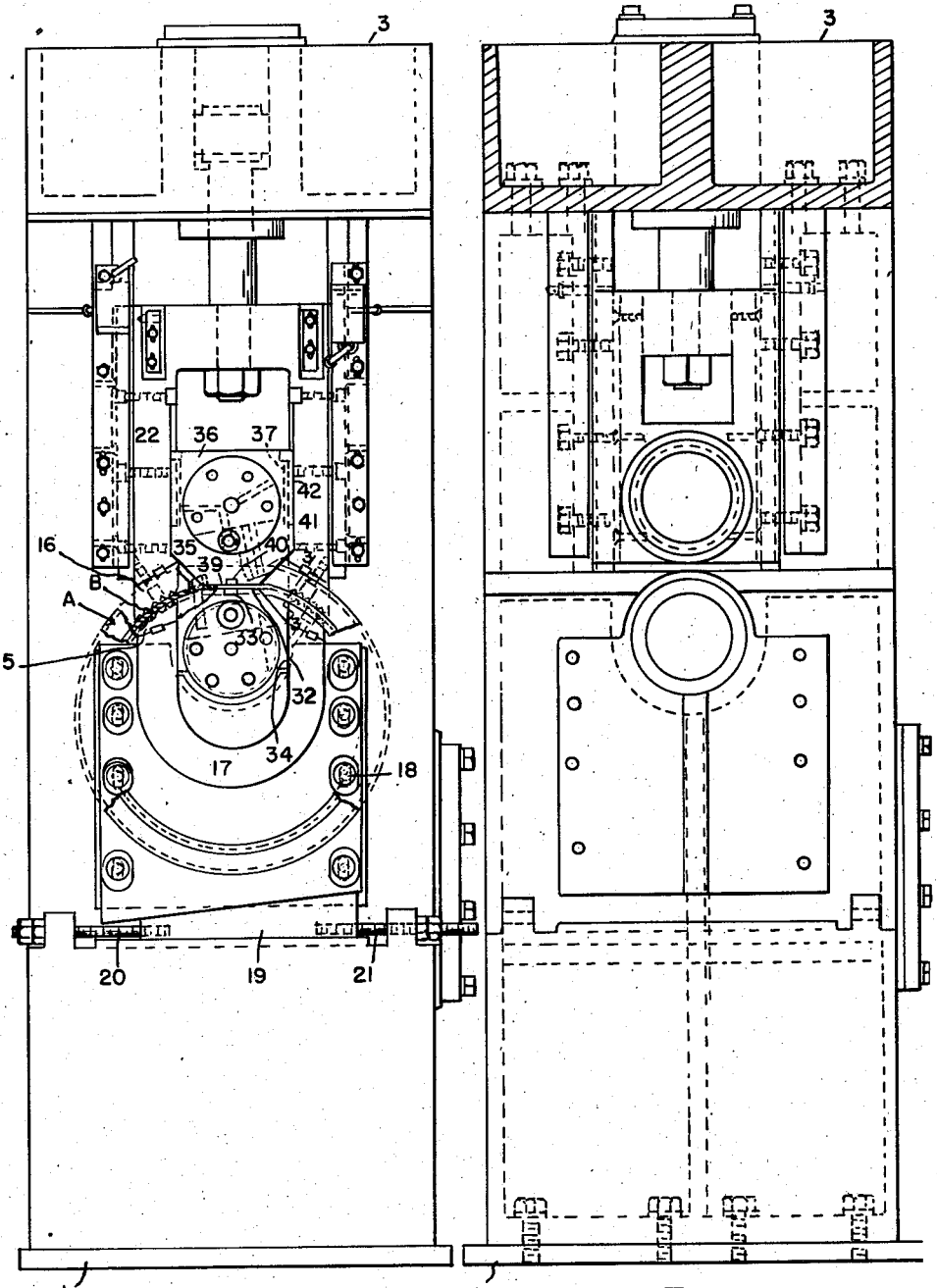
Figure 4:
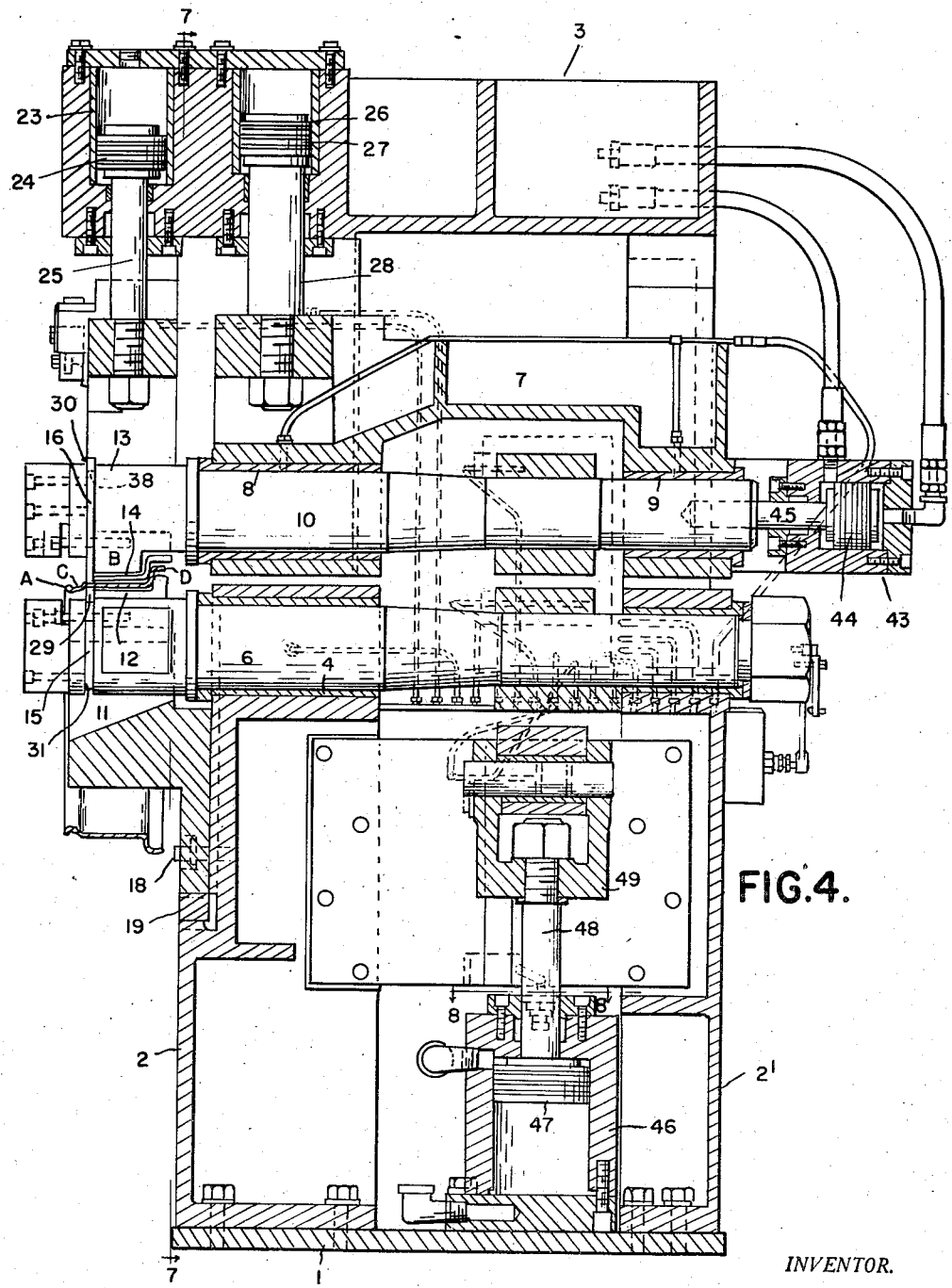

Figures 4, 5 and 6 are cross sections on the lines 4—4, 5—5 and 6—6, respectively, of Figure 2;

Figures 7 and 8 are cross sections on the lines 7—7 and 8—8, respectively, of Figure 4.

As illustrated in the present instance, the weld flash trimming machine is designed to remove the weld flash or the metal extruded during the welding of a tire carrying rim A of the solid base type having the base B, the gutter C at one edge of the base and the generally radial tire retaining flange D at the other edge. This rim in the present instance is formed from hot rolled strip stock by hooping and welding the ends. The portion of the rim in the zone of the weld is flat. The machine comprises the base 1, the spaced front and rear uprights 2 and 2', respectively, secured to the base and the top 3 connecting and secured to the front and rear uprights. The front and rear uprights have rigidly secured thereto the axially aligned bearings 4 and 5, respectively, in which is journaled the horizontal shaft 6. The machine also comprises the bracket 7 which is vertically adjustably mounted on the uprights and which has rigidly secured thereto the axially aligned bearings 8 and 9 in which is journaled the shaft 10. The axis of the shaft 10 is vertically above the axis of the shaft 6.

The shaft 6 has fixedly secured to one end thereof the cutter head 11 to which is fixedly secured the cutter blade 12. The shaft 10 has fixedly secured to the corresponding end thereof the cutter head 13 to which is fixedly secured the cutter blade 14. Both cutter blades are inclined to the axes of their respective cutter heads so that as the cutter blades are moved along the rim and across the weld they progressively cut the portions of the weld flash or the metal extruded during the welding along their lengths. The cutter blade 12 has its cutting edge corresponding to the contour of the radially inner face of the major part of the base B of the rim and the axially inner and radially inner faces of the tire retaining flange D or the rim. The cutter blade 14 has its cutting edge corresponding to the contour of the radially outer face of the major part of the base B of the rim and the axially outer and radially outer faces of the tire retaining flange D of the rim.

The rim is clamped in place on the machine with the axially inner face of the tire retaining flange D against the associated cutting edge portion of the lower cutter blade 12 by means of the lower and upper clamps 15 and 16, respectively, these clamps being arranged in pairs engageable with the portions of the rim base B at opposite sides of the flattened welded portion of the rim. The lower clamps are carried by the bifurcated support 17 which embraces the cutter head 11 and which is vertically adjustably secured to the front upright 2 in predetermined relation to the shaft 6 by the bolts 18. The lower end of the support 17 is inclined relative to a horizontal plane and is engaged by the wedge 19 which is horizontally slidably mounted on the front upright 2 and is capable of being horizontally adjusted by the screws 20 and 21 to thereby vertically adjust the support. The upper clamps 16 are carried by the bifurcated slide 22 which embraces the cutter head 13 and which is guided for vertical movement by the front upright 2. For moving the slide downwardly and upwardly, there is the cylinder 23 rigidly mounted on the top 3, the piston 24 slidable within the cylinder and the shouldered piston rod 25 rigidly secured to the cross portion of the slide.

For lowering and raising the bracket 7, there is the cylinder 26 rigidly mounted on the top 3, the piston 27 slidable within the cylinder and the shouldered piston rod 28 rigidly secured to the upper portion of the bracket.

By admitting fluid medium under pressure to either of the ends of the cylinders 23 and 26, their respective pistons may be moved downwardly and upwardly and by controlling the pressure of the fluid medium the pistons and their associated parts are readily held in their lower or upper positions.

To support the flattened welded portion of the rim A in predetermined radial relation to the lower cutter head 11 so that the lower cutter blade 12 will remove the desired amount of weld flash or extruded metal, I have provided the lower contact member 29 engageable with the flattened portion of the rim base B adjacent the gutter C. To limit the downward movement of the bracket 7 and the associated shaft 10 and upper cutter head 13 and thereby position the upper cutter head radially relative to the flattened welded portion of the rim A so that the upper cutter blade 14 will remove the desired amount of weld flash or extruded metal, I have provided the upper contact member 30 engageable with the flattened portion of the rim base B adjacent the cutter C and opposite the lower contact member. The lower contact member 29 has a generally semi-circular inner edge portion which extends within the upper portion of the annular groove 31 formed in the lower cutter head 11. The contact member 29 also has the flat upper edge 32 for contacting the radially inner face of the flattened portion of the rim base B at opposite sides of the weld flash or extruded metal for which clearance is provided by the notch 33 in the upper portion of the contact member. The contact member 29 also has the side edges 34 which are engaged by the support 17 to hold the contact member from rotative movement during rotative movement of the shaft 6. The upper contact member 30 is formed of the lower and upper sections 35 and 36, respectively, which are secured together by suitable means such as the screws 37. These sections together form a circular inner edge portion which extends into the annular groove 38 formed in the upper cutter head 13. The lower section 35 has the flat lower edge 39 for contacting the radially outer face of the flattened portion of the rim base B at opposite sides of the weld flash or extruded metal, clearance for the latter being provided by the notch 40 formed in the lower edge portion. The lower and upper sections have vertically aligned side edges 41 and 42 for engaging the bifurcations of the slide 22, the arrangement being such that the slide holds the upper contact member 30 from rotative movement during rotative movement of the shaft 10. It will be noted that when the rim A is inserted into place with its flange D against the associated portion of the lower cutter blade 12, the flattened portion of the rim base B adjacent the cutter C rests on and is positioned by the lower contact member 29 and that when the bracket 7 is lowered the upper contact member 30 is lowered into contact with the portion of the rim base B adjacent the cutter C directly above the contact member 29. As a result, the lowermost position of the upper cutter head 13 is determined in accordance with the thickness of the stock forming the rim.

When the bracket 7 and the associated shaft 10 and upper cutter head 13 are lowered, the shaft and cutter head occupy a forward position such that the cutter blade 14 clears the tire retaining flange D. For the purpose of properly adjusting the cutter blade 14 to fit the contour of the axially outer and radially outer faces of the tire retaining flange, the shaft 10, in addition to being journaled in the bearings 8 and 9, is also longitudinally slidable in these bearings. To move the shaft rearwardly to bring its cutter blade into contact with the tire retaining flange, there are the cylinder 43 upon the rear end of the bracket 7 in axial alignment with the shaft 10 and the piston 44 slidable within the cylinder and positively connected to the shaft by the piston rod 45. It is apparent that when fluid medium under pressure is admitted into the front end of the cylinder, the piston 44, the shaft and the associated cutter head and cutter blade will be moved rearwardly until the cutter blade contacts the tire retaining flange, the pressure of the fluid medium being controlled so that upon contact of the cutter blade with the tire retaining flange further rearward movement is stopped. It is also apparent that when fluid medium under pressure is admitted into the rear end of the cylinder, the piston and associated parts will move forwardly to normal position.

The shafts 6 and 10 are partially rotatable or oscillatable to effect the cutting. 46 is a vertical cylinder mounted on the base 1 between the front and rear uprights and 47 is a piston slidable within the cylinder and connected by the shouldered piston rod 48 to the slide 49 which is vertically guided by the rear upright 2'. The slide is pivotally connected to the lower link 50 which in turn is pivotally connected to the upper link 51 and the arm 52 by the pivot pin 53. The upper link 51 is pivotally connected to the arm 54 by the pivot pin 55. The arm 52 is fixedly secured to the shaft 6, while the arm 54 is fixedly secured to the shaft 10. The arrangement is such that when fluid medium under pressure is admitted into the lower end of the cylinder 46, the piston 47 is moved upwardly and this piston through the piston rod 48 and the slide 49 moves the links 50 and 51 upwardly, thereby swinging the arms 52 and 54 in a clockwise direction. These arms correspondingly rotate the shafts 6 and 10 to move the cutter blades 12 and 14 through their cutting arcs from their positions shown in Figure 1. The arrangement is such that the cutter blades are moved in opposite directions along the rim and simultaneously cut the weld flash or extruded metal at both sides of the rim. After the weld flash or extruded metal has been cut away, it is apparent that by admitting fluid medium under pressure into the upper end of the cylinder 46 the parts will be returned to their off positions.

In operation, the rim A is placed between the clamps 15 and 16 with the tire retaining flange D against the associated cutting edge of the cutter blade 12, the clamps 16 being in their raised position, as is also the bracket 7 carrying the shaft 10, the cutter head 13 and the cutter blade 14. At this time the cutter blades 12 and 14 are angularly offset from the rim weld and occupy the positions shown in Figure 1. When the operator of the machine trips the actuating mechanism, fluid medium under pressure is admitted into the upper end of the cylinder 23 so that the piston 24 is lowered to lower the clamps 16 against the rim. Then the fluid medium under pressure is admitted to the upper end of the cylinder 26 causing the piston 27 to lower to thereby move the bracket 7 downwardly with the associated shaft 10, the cutter head 13 and the cutter blade 14 and also the upper contact member 30 until the contact member abuts the radially outer face of the rim base B in opposed relation to the lower contact member 29. Then fluid medium under pressure is admitted to the front end of the piston 43 causing the piston 44 to move rearwardly until the cutter blade 14 engages the tire retaining flange D of the rim. Then fluid medium under pressure is admitted to the lower end of the cylinder 46 causing the piston 47 to move upwardly to rotate or oscillate through the intermediate connections the shafts 6 and 10 and their cutter blades 12 and 14, thereby moving the cutter blades through their cutting arcs to effect the cutting or trimming of the flash weld or extruded metal. When the cutters have completed their cuts, fluid medium under pressure is admitted to the opposite ends of all of the cylinders and the fluid medium under pressure previously admitted is allowed to exhaust so that the pistons and the mechanisms associated therewith are all returned to normal or off positions, after which the trimmed rim may be removed and another rim inserted. The pressure of the fluid medium is entirely controlled automatically by setting the pressure control valves. The above operation of the machine is preferably accomplished automatically so that the operator of the machine need only place the rim in the machine, press the starting button and remove the trimmed rim.

What I claim as my invention is:

1. In a weld flash trimming machine, a cutter head, a cutter blade carried by said cutter head and movable along one side of the work across its weld, a second cutter head, a second cutter blade carried by said second cutter head and movable along the opposite side of the work across its weld, means on said first mentioned cutter head cooperating with said first mentioned cutter blade to predeterminedly position the work relative to said first mentioned cutter head and cutter blade, means for moving said second cutter head relative to said first mentioned cutter head toward the work, means on said second cutter head cooperating with said second cutter blade to predeterminedly position said second cutter head and blade relative to the work, and means for moving said cutter heads to move said cutter blades across the weld.

2. In a machine for trimming the weld flash of work of formed cross section, a pair of angularly movable cutter heads relatively movable toward and away from each other, cutter blades carried by said cutter heads and having cutting edges corresponding to the contours of the opposite sides of a part of said work, means on said cutter heads engageable with the work for controlling the relative movement of said cutter heads toward each other, and means for relatively moving said cutter heads longitudinally of each other to position said cutter blades relative to the work.

3. In a machine for trimming the weld flash of work having angularly disposed portions, cutter heads, cutter blades carried by said cutter heads and movable along opposite sides of the work across its weld, said cutter blades having cutting edges corresponding to the contours of the opposite sides of one angularly disposed portion and a part of the other angularly disposed portion, means for relatively moving said cutter heads toward and away from each other and longitudinally of each other, and means for moving said cutter heads to move said cutter blades across the weld.

4. In a machine for trimming the weld flash of working having a base and a transverse flange, a cutter head, a cutter blade carried by said cutter head and movable along one side of the work across its weld, a second cutter head, a second cutter blade carried by said second cutter head and movable along the opposite side of the work across its weld, said cutter blades having cutting edges corresponding to the contours of the opposite sides of the base and transverse flange, means on said first mentioned cutter head cooperating with said first mentioned cutter blade to position the work relative to said first mentioned cutter head and blade, means for moving said second cutter head toward said first mentioned cutter head and the work, means on said second mentioned cutter head engageable with the work to limit the movement of said second cutter head toward said first mentioned cutter head and the work, means for moving said second cutter head longitudinally relative to said first mentioned cutter head and the work to engage said second cutter blade with the transverse flange, and means for moving said cutter heads to move said cutter blades across the weld.

5. In a machine for trimming the weld flash of a rim having a base and a radial flange and formed with a flattened transversely welded portion, clamping jaws engageable with the rim base at opposite sides of the flattened portion, a cutter head, a cutter blade carried by said cutter head and having a cutting edge corresponding to the contour of a part of the radially inner side of the rim base and the axially inner side of the radial flange, a contact member engageable with the flattened portion of the rim base axially beyond said cutter blade for positioning the rim base radially relative to said cutter head, a second cutter head, a second cutter blade carried by said second cutter head and having a cutting edge corresponding to the contour of a part of the radially outer side of the rim base and the axially outer side of the radial flange, means for moving said second cutter head toward said first mentioned cutter head, a contact member engageable with the rim base axially beyond said second cutter blade for positioning said second cutter head relative to the rim base radially of said second cutter head, means for longitudinally moving said second cutter head relative to said first mentioned cutter head to engage said second cutter blade with the radial flange, and means for angularly moving said cutter heads to move said cutter blades across the weld.

6. In a weld flash trimming machine, a pair of rotatable shafts, cutter heads on said shafts, cutter blades carried by said cutter heads and movable along opposite sides of the work across its weld, means for moving one of said shafts toward and away from the other of said shafts, arms on said shafts, a cylinder, a piston reciprocable within said cylinder, and linkage between the arms and piston for rotating said shafts upon movement of said piston to move said cutter blades across the weld.

7. In a machine for trimming the weld flash of a rim member, a shaft rotatable about a fixed axis, a cutter head carried by said shaft, a cutter blade carried by said cutter head and movable along one side of the rim member across its weld, a second rotatable shaft, a cutter head carried by said second shaft, a cutter blade carried by said second cutter head and movable along the opposite side of the rim member across its weld, a bracket movable toward and away from said first mentioned shaft and carrying said second shaft, arms on said shafts, a cylinder, and a piston reciprocable within said cylinder operatively connected to said arms to rotate said shafts and compel said cutter blades to move across the weld of the rim member.

8. In a machine for trimming the weld flash of a rim member having a base and a radial flange and formed with a flattened portion, stationary clamping means engageable with the rim base at opposite sides of the flattened portion, a shaft rotatable about an axis fixed relative to said stationary clamping means, a cutter blade carried by said shaft and having a cutting edge corresponding to the contour of a part of the radially inner side of the rim base and the axially inner side of the radial flange, a contact member carried by said shaft and engageable with the flattened portion of the rim base axially beyond said cutter blade for positioning the flattened portion of the rim member radially relative to said shaft, said contact member being guided by said stationary clamping means, clamping means movable toward and away from said first mentioned clamping means and cooperable therewith to clamp said rim member in place, a second rotatable shaft, a second cutter blade carried by said second shaft having a cutting edge corresponding to the contour of a part of the radially outer side of said rim base and the axially outer side of said radial flange, a second contact member carried by said second shaft and guided by said second mentioned clamping means, said second mentioned contact member being engageable with the flattened portion of the rim base axially beyond said second cutter blade and opposite said first mentioned contact member, means for moving said second shaft toward and away from said first mentioned shaft, means for axially moving said second shaft to engage said second cutter blade with the radial flange, and fluid pressure operated linkage connected to said shafts to oscillate the same and to move said cutter blades across the weld of the work.

9. In a machine for trimming the weld flash of work, pairs of clamping jaws engageable with the work, angularly movable cutter heads relatively movable toward and away from each other, cutter blades carried by said cutter heads and movable on angular movement of said cutter heads along the opposite sides of the work across its weld, and means on said cutter heads and engageable with the portion of the work between said pairs of clamping jaws to position said cutter heads in operative relation to the work.

10. In a machine for trimming the weld flash of work, angularly movable cutter heads, cutter blades on said cutter heads movable along the opposite sides of the work across its weld, one of said cutter heads being movable toward and away from the other of said cutter heads and being provided with a groove, and means on said movable cutter head and extending into its groove and engageable with the work to control the movement of said movable cutter head toward the other of said cutter heads.

11. In a weld flash trimming machine, a pair of cutter heads, cutter blades carried by said cutter heads and movable along opposite sides of the work across its weld, means for relatively moving said cutter heads in one direction toward and away from each other and in a transverse direction longitudinally of each other distances determined by the work, and means for moving said cutter heads to move said cutter blades across the weld.

EMMETT S. ELLIS.